3,530,146
SUBSTITUTED BENZOTHIOPHENDIONE COMPOUNDS

Howard Newman, Monsey, and Robert Bruce Angier, Pearl River, N.Y., assignors to American Cyanamid Company, Stamford, Conn., a corporation of Maine
No Drawing. Filed July 1, 1968, Ser. No. 741,256
Int. Cl. C07d 63/22; C12b 1/00; A61k 27/00
U.S. Cl. 260—330.5                4 Claims

ABSTRACT OF THE DISCLOSURE

The preparation of substituted unsaturated thiogriseofulvin compounds using 3,5-dimethoxyaniline as starting material, is described. The present compounds are useful as intermediates for the preparation of substituted thiogriseofulvins which are prepared by fermentation of the present compounds in the presence of *Streptomyces cinereocrocatus*. The latter compounds are highly active fungicides.

This application is related to application Ser. No. 741,328, filed concurrently herewith, said relationship being described hereinafter.

SUMMARY OF THE INVENTION

This invention relates to new organic compounds and more particularly, is concerned with precursors of substituted thiogriseofulvin compounds. The compounds of this invention may be represented by the following formula:

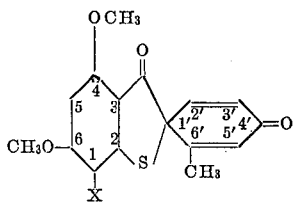

wherein X is hydrogen, chlorine or bromine.

The novel compounds of this invention are, in general, off-white crystalline solids. The compounds are soluble in the more common organic solvents, as for example, alcohol and acetone, and relatively insoluble in water.

The preparation of representative compounds of this invention are shown by the sequence of reactions in the flowchart directly following:

FLOWCHART

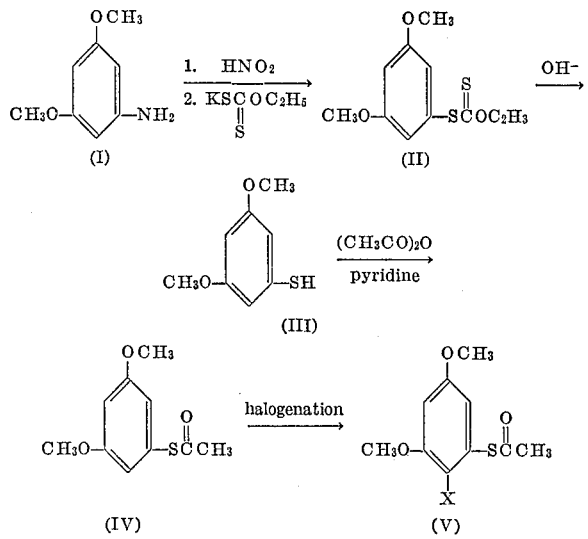

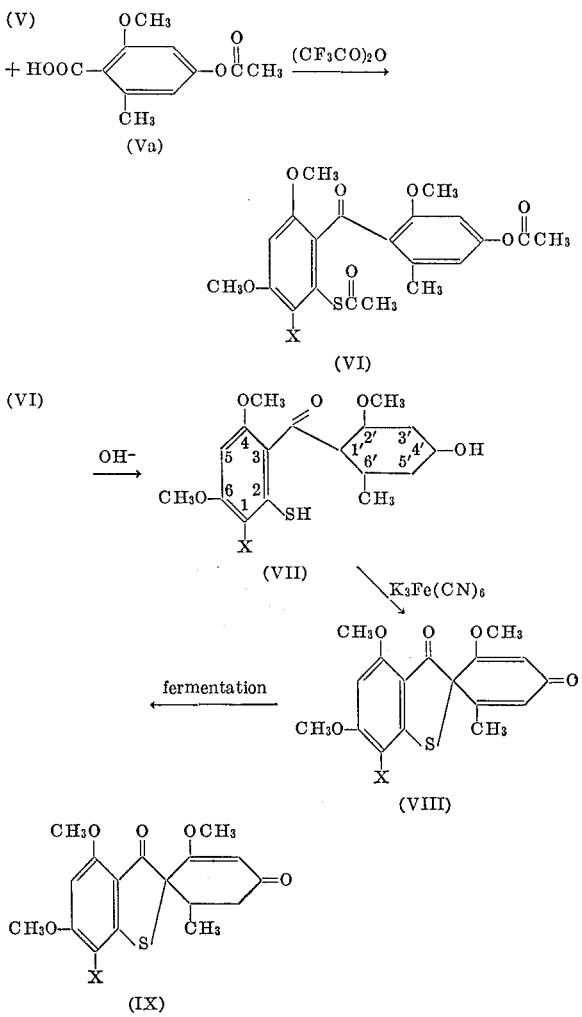

wherein X is as defined hereinbefore.

In accordance with the above flowchart, reacting the starting compound, 3,5-dimethoxyaniline (I) with nitrous acid (generated in situ from an alkali metal nitrate and hydrochloric acid) produces the diazonium salt which is then allowed to react with potassium ethyl xanthate to give the xanthate (II). Hydrolysis of the latter under strongly basic conditions produces 3,5-dimethoxy thiophenol compound (III). The starting compound (I) is well-known and available commercially. Following the diazotization of (I) the formation of the thiophenol is preferably carried out at a temperature of from 80° C. to 100° C. in a substantially aqueous solvent. Acylation of the substituted thiophenol is effected with acetic anhydride in pyridine as shown in the flowchart and Example 2, producing the 3,5-dimethoxythiophenol, acetate IV. Halogenation of the substituted thiophenol acetate, as for example, with N-chlorosuccinimide or N-bromosuccinimide, furnishes the 5-chloro or bromo product (V). The preferred conditions for this halogenation involves the use of hydrocarbon solvent such as, benzene, elevated temperatures, and irradiation (sun lamp). A generally preferred procedure to determine the completion of reaction is to use starch-iodide paper. Approximately 25 hours is usually required to complete the reaction. The acylation of (V) with isoeverninic acid acetate (Va), preferably conducted in trifluoroacetic anhydride at about 55° C., furnishes the benzophenone (VI) which on hydrolysis with aqueous base is converted into (VII). Oxidation of (VII) as, for example, with aqueous alkali metal ferricyanide produces the dehydrogriseofulvin thio analog (VIII). The novel compounds of this invention are useful as intermediates in the preparation of substituted thiogriseofulvin. The chemical or biological reduction of 7-chloro or bromo-2',4,6-trimethoxy-6'-methyl-spiro[benzo[b]thiophene-2(3H), 1' - [2,5]cyclohexadiene]-3,4-dione, for example, leads to the sulfur analog of griseofulvin, a compound which has high in vitro antifungal activity. The biological reduction is readily carried out by the use of the microorganism *Streptomyces cinereocrocatus* NRRL 3443 (freely available to the general public), which process is described hereinafter in the examples and claimed in the application of co-workers Howard Newman, Ping Shu, and William W. Andres, Ser. No. 741,328, filed July 1, 1968.

DETAILED DESCRIPTION

The following examples illustrate the invention in more detail.

Examples 1 through 6 illustrate the preparation of 7 - chloro or 7-bromo-2',4,6 - trimethoxy-6'-methyl-spiro[benzo[b]-thiophene-2(3H), 1'-[2,5]cyclohexadiene] - 3, 4'-dione starting with dimethoxyaniline. Examples 7 through 9 illustrate the preparation of 2',4,5-trimethoxy-6'-methyl-spiro[benzo[b]thiophene - 2-(3H), 1'-[2,5]cyclohexadiene]-3,4'-dione starting with 3,5-dimethoxythiophenol, acetate. Preparation of the bromo derivative may be carried out by appropriately substituting N-bromosuccinimide in place of N-chlorosuccinimide. It is pointed out that bromination or chlorination of the novel products may be carried out on compounds other than that indicated in the flowchart. The compounds of Example 7 and Example 9, likewise, may be chlorinated or brominated using standard techniques, as for example, using N-bromosuccinimide or N-chlorosuccinimide. Example 10 describes the fermentation of dehydro-1-thiogriseofulvin to produce (+)-1-thiogriseofulvin and (+)-5'-hydroxy-1-thiogriseofulvin.

EXAMPLE 1

Preparation of 3,5-dimethoxythiophenol (III)

To a stirred, cooled (ice-water) suspension of 37 g. (0.24 mole) of 3,5-dimethoxyaniline (I) of 200 ml. of water containing 50 ml. (0.6 mole) of concentrated hydrochloric acid is added a solution of 16.6 g. (0.24 mole) of sodium nitrite in 50 ml. of water. The rate of addition is regulated so as not to allow the reaction temperature to exceed 5° C. The resulting red-purple, moderately thick solution of diazonium salt is added over a period of 30 minutes to a stirred solution of 250 g. (1.7 moles) of potassium ethyl xanthate in 200 ml. of water at 85–90° C. After cooling, the almost black reaction mixture is extracted with ether and the ethereal extracts are washed with dilute sodium hydroxide, water, and then dried and evaporated to dryness. The residual crude xanthate (II) (49 g.) is heated under reflux in 200 ml. of 90% ethanol containing 100 g. of potassium hydroxide for 15 hours. The refluxed mixture is then extracted with ether (to remove any base insoluble material) and the basic aqueous phase acidified with concentrated hydrochloric acid. The water insoluble product which separated is extracted with ether and the ethereal extracts are washed, dried and evaporated to yield 23 g. of liquid residue containing the crude desired product. Distillation under reduced pressure from zinc dust gives 12.8 g. (31%) of the thiophenol (III), boiling point 111° C. (0.1 mm.); $n_D^{25}$ 1.5830.

*Analysis.*—Calc'd for $C_8H_{10}O_2S$ (170.18), (percent): C, 56.46; H, 5.92; S, 18.84. Found (percent): C, 56.78; H, 499; S, 18.43.

EXAMPLE 2

Preparation of 3,5-dimethoxythiophenol, acetate (IV)

A cooled solution of 2 g. (0.012 mole) of 3,5-dimethoxythiophenol in 4 ml. of dry pyridine is treated with 4 ml. of acetic anhydride. The reaction mixture is kept at room temperature overnight, then poured into ice-water and the product extracted with ether. The ethereal extracts are washed successively with cold dilute hydrochloric acid, cold water, aqueous bicarbonate, dried and evaporated to yield 2.4 g. (96%) of the acetate derivative as a colorless, crystalline solid, melting point 61–62.5° C., $$\lambda_{max.}^{Nujol} 5.85\mu$$

*Analysis.*—Calc'd for $C_{10}H_{12}O_3S$ (212.27), (percent): C, 56.58; H, 5.71; S, 15.11. Found (percent): C, 56.40; H, 5.88; S, 14.80.

EXAMPLE 3

Preparation of 2-chloro-3,5-dimethoxythio phenol, acetate (V)

To a solution of 7.8 g. (0.037 mole) 3,5-dimethoxythiophenol, acetate in 135 ml. of dry benzene is added 5 g. (0.037 mole) of N-chlorosuccinimide. The reaction mixture is stirred and irradiated for 23 hours with a 150 watt (General Electric projector) lamp placed about 4 to 6 inches from the side of the flask. The heat generated by the lamp raised the temperature of the reaction mixture to 77° C. and gives a homogeneous system. (N-chlorosuccinimide is only partially soluble in benzene at room temperature). The course of the reaction is followed by periodic testing of the reaction mixture for active halogen with starch-iodide paper. The test is still weakly positive after 18 hours, but is essentially negative after 21 hours. The orange solution is washed with water, dried and evaporated to yield an oily residue which is heated in a relatively small amount of ether and kept at room temperature overnight. A beige colored solid is obtained (5.3 g.) which melts at 87–90° C., (soften ca. 84° C.). An additional 0.87 g. of solid, melting point 81–86° C., is isolated by concentrating the mother liquors giving a total yield of 6.2 g. (68%). An analytical sample is obtained by partially dissolving a sample of the product in boiling ether and collecting the solids after an hour at room temperature; melting point 87–89.5° C. (softens 85° C.);

$$\lambda_{max.}^{Nujol} 5.90\mu$$

*Analysis.*—Calc'd for $C_{10}H_{11}ClO_3S$ (246.72), (percent): C, 48.68; H, 4.50; S, 13.00. Found (percent): C, 48.78; H, 4.62; S, 12.70.

The corresponding 2-bromo-3,5-dimethoxythiophenol acetate is obtained when N-bromosuccinimide is used in place of N-chlorosuccinimide.

EXAMPLE 4

Preparation of 4-hydroxy-2'-mercapto-3-chloro-2,4'-6'-trimethoxy-6-methylbenzophenone diacetate (VI)

A mixture of 4.4 g. (0.018 mole) of 2-chloro-3,5-dimethoxythiophenol, acetate, (prepared in Example 3) and 4.0 g. (0.018 mole) of isoeverninic acid acetate (H. Newman and A. Durante, J. Org. Chem. 31 2291 (1960)) in 60 ml. of trifluoroacetic anhydride is heated in a pressure bottle at 55–60° C. for 20 hours. The dark solution is evaporated to dryness under reduced pressure and the residue is dissolved in methylene chloride. This solution is washed with aqueous bicarbonate, dried and evaporated to yield a gummy residue which solidifies on trituration with ether. The product, 4-hydroxy-2'-mercapto-3-chloro-2,4',6' - trimethoxy - 6 - methylbenzophenone diacetate, a purple-tinged, colorless solid, is obtained by filtration, 2.8 g. (34%), melting point 163–166° C. Heating in boiling methanol, furnishes an analytical sample, melting point 168–170° C.;

$$\lambda_{max.}^{Nujol} 5.67\mu$$

*Analysis.*—Calc'd for $C_{21}H_{21}ClO_7S$ (452.91), (percent): C, 55.69; H, 4.67; S, 7.08. Found (percent): C, 55.94; H, 5.09; S, 7.06.

The corresponding 4-hydroxy-2'-mercapto-3-bromo- 2,4',6'-trimethoxy-6-methylbenzophenone diacetate is obtained when 2-bromo-3,5-dimethoxythiophenol acetate, (prepared in Example 3) is used as starting material in the above reaction.

EXAMPLE 5

Preparation of 4-hydroxy-2'-mercapto-3-chloro-2,4',6' trimethoxy-6-methylbenzophenone (VIII)

Nitrogen is bubbled through a stirred suspension of 2.5 g. (0.055 mole) of 4-hydroxy-2'-mercapto-3-chloro-2,4',6'-trimethoxy-6-methylbenzophenone diacetate, (prepared in Example 4) in 40 ml. of methanol at room temperature and 40 ml. of 2 N aqueous sodium hydroxide is added in a period of about 3 minutes. Stirring is continued until the reaction mixture is homogeneous, about 10 to 15 minutes. The nitrogen passage is terminated, the flask stoppered and kept at room temperature for an additional 75 minutes. Ice is then added to the solution and the cold solution is acidified with cold, fairly concentrated hydrochloric acid. The practically colorless gum which separates, solidifies almost immediately and is collected after 15 minutes and air dried overnight; yield 2.0 g. (99%), melting point 195–199° C. Recrystallization from aqueous methanol gives an analytical sample, melting point 198–199° C.

$\lambda_{max.}^{Nujol}$ $2.90\mu$ and $6.33\mu$. The latter band shows two inflections, at 6.13 and $6.23\mu$.

*Analysis.*—Calc'd for $C_{17}H_{17}ClO_5S$ (368.78), (percent): C, 55.36; H, 4.65; S, 8.70. Found (percent): C, 55.05; H, 4.83; S, 8.43.

Following the above procedure and using as starting material 4-hydroxy-2'-mercapto-3-bromo - 2,4' - 6' - trimethoxy-6-methylbenzophenone diacetate the product 4-hydroxy - 2' - mercapto - 3 - bromo-2,4',6'-trimethoxy-6-methylbenzophenone, is obtained.

EXAMPLE 6

Preparation of 7 - chloro - 2',4,6 - trimethoxy-6'-methyl-spiro[benzo-[b]thiophene - 2(3H),1' - [2,5]cyclohexadiene]3,4'-dione VIII (dehydro-1-thiogriseofulvin)

A solution of 1.7 g. (0.0046 mole) of 4-hydroxy-2'-mercapto - 3 - chloro-2,4'-6'-trimethoxy-6-methylbenzophenone (VII) in 150 ml. of water containing 25 g. of potassium carbonate is added dropwise over a period of about 10 minutes to a stirred solution of 6 g. (0.018 mole) of potassium ferricyanide in 75 ml. of water. The solid, which starts to separate almost immediately, is collected after one hour of additional stirring. The solid is suspended in boiling ethanol and again collected; yield 1.3 g. (77%), melting point 235–238° C. A portion of this product again heated in boiling ethanol to furnish an analytical sample of 7-chloro-2'-4,6-trimethoxy-6'-methyl - spiro[benzo[b]thiophene-2(3H),1' - [2,5]cyclohexadiene]-3,4'-dione, melting point 236–238° C.

$\lambda_{max.}^{Nujol}$ 5.90 and $6.02\mu$ $\lambda_{max.}^{MeOH}$ 348 ($\epsilon$ 4,550), 306 ($\epsilon$ 18,700) and $235\mu$ ($\epsilon$ 43,300).

*Analysis.*—Calc'd for $C_{17}H_{15}ClO_5S$ (366.82), (percent): C, 55.66; H, 4.12; Cl, 9.67; S, 8.74. Found (percent): C, 55.66; H, 4.41; Cl, 9.84; S, 8.63.

EXAMPLE 7

Preparation of 4-hydroxy-2'-mercapto-2,4'6'-trimethoxy-6-methylbenzophenone, diacetate A solution of 0.8 g. (0.0036 mole) of isoeverninic acid acetate and 0.76 g. (0.0063 mole) of 3,5-dimethoxythiophenol, acetate in 10 ml. of trifluoroacetic anhydride is kept at room temperature for 17.5 hours after which period the excess anhydride is removed under reduced pressure. The residue is taken up in ether and the ethereal solution is washed with aqueous bicarbonate, water, dried and evaporated to yield 1.3 g. of a brown gum which rapidly solidified on trituration with ether. The colorless solid is collected after 15 minutes: yield, 0.48 g. (32%); melting point 113–115° C. Recrystallization of the crude product from methanol furnishes an analytical sample, melting point 117.5–119.5° C.

$\lambda_{max.}^{Nujol}$ $5.68\mu$ (OAc), $5.87\mu$ (—SCOCH$_3$) and $6.00\mu$ (ArCOAr).

*Analysis.*—Calc'd for $C_{21}H_{22}O_7S$ (418.46), (percent): C, 60.27; H, 5.30; S, 7.66. Found (percent): C, 60.56; H, 5.59; S, 7.67.

EXAMPLE 8

Preparation of 4-hydroxy-2'-mercapto-2,4',6'-trimethoxy-6-methylbenzophenone

To a cooled (ice-water) suspension of 2 g. (0.0048 mole) of 4 - hydroxy-2' - mercapto-2,4'6'-trimethoxy-6-methylbenzophenone, diacetate (Example 7) in 20 ml. of methanol is added 5 ml. of 2 N aqueous sodium hydroxide. The reaction mixture is stirred at room temperature for 25 minutes. (The system is homogeneous after about 2 minutes). At the end of this period, ice is added and the solution is acidified. Methylene chloride is added to the resulting aqueous suspension and the nearly colorless solid is collected after brief stirring: yield 0.5 g.; melting point 185–186.5° C. Drying and evaporation of the methylene chloride phase gives 0.9 g. of a foam which on trituration with ether-methanol yields an additional 0.25 g. of the product, melting point 185–188° C. Recrystallization from methanol furnished an analytical sample, melting point 189.5–191.5° C.

$\lambda_{max.}^{Nujol}$ $2.95\mu$ and $6.14\mu$ $\lambda_{max.}^{MeOH}$ 298 m$\mu$ ($\epsilon$ 10,500) and 240 m$\mu$ ($\epsilon$ 19,000).

*Analysis.*—Calc'd for $C_{17}H_{18}O_5S$ (334.38), (percent): C, 61.06; H, 5.43; S, 5.59. Found (percent): C, 61.02; H, 5.69; S, 9.50.

EXAMPLE 9

Preparation of 2',4,6-trimethoxy-6'-methyl-spiro[benzo[b]thiophene-2(3H,1'-[2,5]cyclohexadiene]3,4'-dione A solution of 0.61 g. (0.0018 mole) of 4-hydroxy-2'-mercapto-2,4',6'-trimethoxy-6-methylbenzophenone in 60 ml. of water containing 10.5 g. of potassium carbonate is added dropwise over a 15 minute period to a stirred solution of 2.4 g. (0.0073 mole) of potassium ferricyanide in 30 ml. of water. Formation of a solid takes place instantaneously. After stirring for an additional 30 minutes, the solid is collected and washed well with water. Trituration of the washed solid in ether-methanol gives 0.385 g. (64%) of a nearly colorless product, melting point 244–246° C.

$\lambda_{max.}^{Nujol}$ $5.85\mu$, $6.10\mu$ and $6.15\mu$ $\lambda_{max.}^{MeOH}$ 343 m$\mu$ ($\epsilon$ 3,700), 300 m$\mu$ ($\epsilon$ 21,000), 242 m$\mu$ ($\epsilon$ 38,000) and 231 m$\mu$ ($\epsilon$ 34,000).

The analytical sample obtained by heating a suspension of the product in boiling acetone-ether melted at 243–245° C.

*Analysis.*—Calc'd for $C_{17}H_{16}O_5S$ (332.37), (percent): C, 61.53; H, 4.85; S, 9.65. Found (percent): C, 61.20; H, 5.22; S, 9.43.

EXAMPLE 10

Microbiological conversion of dehydro-1-thiogriseofulvin into (+) - 1 - thiogriseofulvin and (+)-5'-hydroxy-1-thiogriseofulvin A typical medium used to grow the primary inoculum is prepared according to the following formula (med. 48–2):

| | Grams |
|---|---|
| Corn starch | 30 |
| Molasses | 20 |
| Soy flour X200 | 10 |
| Calcium carbonate | 10 |
| Yeast extract | 2.5 |

Water to 1,000 milliliters.

The washed or scraped spores from an agar slant of *S. cinereocrocatus* NRRL 3443 are used to inoculate one 500 milliliter flask containing 100 milliliters of the above medium. The flask is placed on a rotary shaker and agitated vigorously for about 48 hours at 28° C. after which time the contents are used to seed 500 milliliter shake flask fermentations.

Fermentation (B)

A fermentation medium is prepared according to the formulation (med. 48–2) as described above in this example. The fermentation medium is sterilized at 120° C. with 15 pounds of pressure p.s.i. for about 20 minutes. Fifty 500 milliliter flasks containing 100 milliliters each of the sterilized medium are each inoculated with 5 milliliters of inoculum prepared as described above in this example. The flasks are then incubated at 28° C. for about 24 hours while being vigorously agitated on a rotary shaker. At the completion of the 24 hours fermentation period, 2 milliliters of a 5 milligram per milliliter solution of dehydro-1-thiogriseofulvin (prepared in Example 6) in methanol are aseptically added to each flask producing a concentration of 100 mcg. of substrate per milliliter of fermentation medium. The flasks are then further incubated at 28° C. for about 48 hours while being vigorously agitated on a rotary shaker, after which time the fermentation mash is harvested. Thin layer chromatography is used to follow the progress of the reaction. Cellulose strips, Eastman cellulose with fluorescent indicator-MN Polygram cell 300/UV-, impregnated with the lower phase of the solvent system composed of hexane, ethyl acetate, methanol and water in the ratio 70:30:15:6 are suitable. Spots are detected by ultraviolet light. Dehydro-1-thiogriseofulvin, (+) - 1 - thiogriseofulvin and (+)-5'-hydroxy-1-thiogriseofulvin have $R_f$ 0.78, $R_f$ 0.92 and $R_f$ 0.65 respectively, in this system.

Isolation (c)

Five liters of fermentation mash is clarified by filtration through Hyflo® and the filtrate extracted with one-half volume of chloroform. The chloroform extract is dried using anhydrous sodium sulfate, which later is removed by filtration, and concentrated to a residue (wt. 530 mg.) under reduced pressure. The residue is purified by means of adsorption column chromatography on silica gel (40 grams). The column is prepared by slurrying the adsorbant in an appropriate volume of chloroform and purifying the slurry into a glass column. The residue, dissolved in a minimal amount of chloroform, is charged onto the column. The column is developed with additional chloroform. The eluate containing both (+)-1-thiogriseofulvin and (+)-5'-hydroxy - 1 - thiogriseofulvin is concentrated to a residue (wt. 27 mg.), under reduced pressure.

The residue obtained above is further purified by means of partition chromatography on diatomaceous earth. The column support is prepared by mixing 0.50 ml. of the lower phase from the system n-hexane, ethyl acetate, methanol and water (380:120:75:30) with each one gram of diatomaceous earth. The wet support is used to pack a glass column. The residue, dissolved in a small amount of lower phase is charged onto the diatomaceous earth column is then eluted with the upper phase of the described solvent system collecting the effluent in separate fractions of suitable volume. The column developed is followed by monitoring the effluent with optical density readings at 245 mμ. (+)-1-thiogriseofulvin is eluted in the second through fourth hold-back-volumes, and (+)-5'-hydroxy-1-thiogriseofulvin is eluted from the sixth through the ninth hold-back-volumes. Appropriate effluent fractions are combined and concentrated under reduced pressure to dryness. The residues are recrystallized from a mixture of acetone and hexane. About 12 mg. of (+)-1-thiogriseofulvin, melting point 188–189° C. and 6 mg. of (+)-5'-hydroxy-1-thiogriseofulvin, melting point 202–203° C. are obtained.

We claim:

1. A substituted benzothiophendione of the formula:

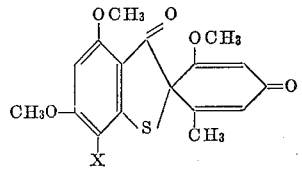

wherein X is selected from the group consisting of hydrogen, chlorine and bromine.

2. The benzothiophendione according to claim 1: 7-chloro-2',4,6 - trimethoxy - 6' - methyl-spiro[benzo[b]thiophene-2(3H),1'-[2,5]-cyclohexadiene]-3,4'-dione.

3. The benzothiophendione according to claim 1: 7-bromo - 2',4,6 - trimethoxy - 6' - methyl-spiro[benzo[b]thiophene-2(3H),1'-[2,5]cyclohexadiene]-3,4'dione.

4. The benzothiophendione according to claim 1: 2',4,6 - trimethoxy - 6' - methyl-spiro[benzo[b]thiophene-2(3H),1'-[2,5]cyclohexadiene]-3,4'-dione.

References Cited

UNITED STATES PATENTS 3,117,981   1/1964   Korger et al. _____ 260—3 5.2

HENRY R. JILES, Primary Examiner

C. M. SHURKO, Assistant Examiner

U.S. Cl. X.R.

195—80; 260—455, 591, 609; 424—275